United States Patent Office 3,584,033
Patented June 8, 1971

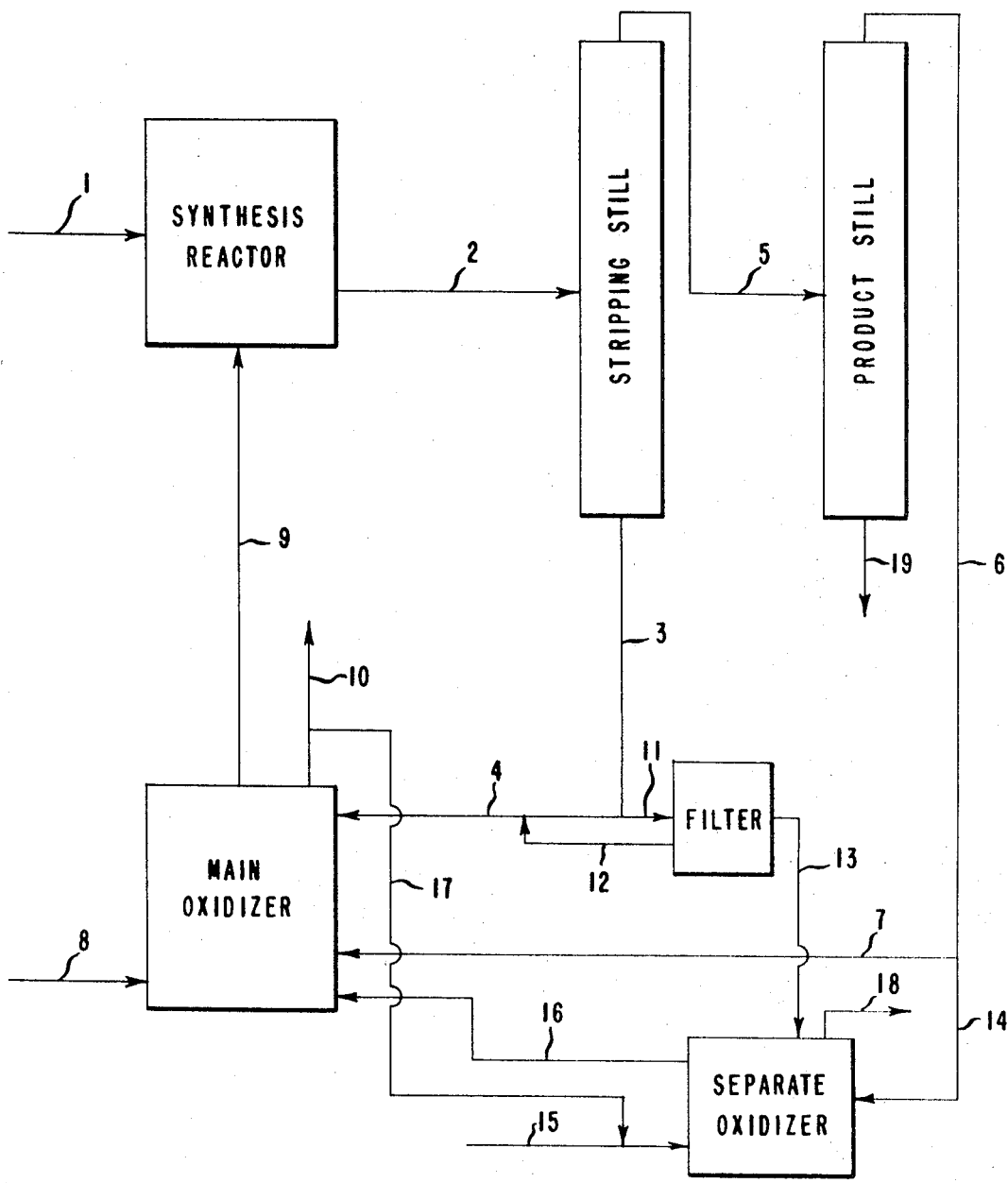

3,584,033
PRODUCTION OF VINYL ACETATE
FROM ETHYLENE
Harry B. Copelin, Niagara Falls, N.Y., assignor to E. I. du Pont de Nemours and Company, Wilmington, Del.
Filed June 23, 1965, Ser. No. 466,246
Int. Cl. C07c 67/04
U.S. Cl. 260—497                                    10 Claims

ABSTRACT OF THE DISCLOSURE

A cyclic method for producing vinyl acetate from ethylene using an acetic acid working solution of a palladium salt, an ionizable metal chloride, cupric acetate and 0–20% water. In a first reaction stage, ethylene is contacted with the reaction solution in a constant environment mixer to produce vinyl acetate and a partially reduced working solution. A portion of the reaction mixture is continuously withdrawn and reoxidized with oxygen in a second reaction stage, following which the reoxidized working solution is recycled to the mixer in the first stage. The reaction mixture in the first stage is maintained at an essentially constant composition wherein the ionizable chloride content of said mixture is within the range of 0.01 to 0.50 molar.

This invention relates to the production of vinyl acetate from ethylene and particularly to a continuous process operated at high conversion levels.

It is known (Moiseev et al., Doklady Akad. Nauk SSSR. 133 377 (1960)) that vinyl acetate can be produced by reacting ethylene with anhydrous acetic acid containing palladium chloride and sodium acetate. The acetic acid reaction medium preferably also contains an oxidizing agent, such as a quinone or a cupric salt whose purpose is to prevent reduction of the palladium salt to metallic palladium. A similar preparation of vinyl acetate is described in British Pat. 928,739.

The oxidizing agent, which becomes reduced during use, may be reoxidized in situ for continued use by means of oxygen supplied with the ethylene to the reaction medium (hereinafter called the "working solution"); or the reduced working solution may be regenerated for reuse by oxidation in a separate operation, as disclosed in Belgian Pats. 608,610 and 614,970, and in French Pat. 1,318,208.

For reasons of economics, numerous attempts have heretofore been made to increase yields by operating at high conversion levels. Many of these attempts have involved the inclusion of chloride ion in the working solution so as to lower the oxidation potential of the palladium II salt catalyst and thereby keep the palladium in the +2 valence state which is required for effective function as a catalyst. While certain improvements in conversion have been experienced by the use of chloride ion in this manner, yet the magnitude of the improvement has not been as great as would normally be desired for a commercial operation. The main reason why added chloride ion has not enabled fully satisfactory conversion levels is the fact that chloride ion is lost during the reaction by precipitation as cuprous chloride. Efforts to compensate for such losses by substantially increasing the chloride ion content of the working solution have been generally unsatisfactory because major proportions of by-products, notably glycol acetates, are formed rather than vinyl acetate.

The present invention provides a process wherein a substantial increase in chloride ion content is used and high conversion levels are achieved without the formation of excessive quantities of by-products. It is a finding of this invention that the above-mentioned difficulties heretofore encountered with high chloride ion contents can be avoided by operating at a high conversion level using a working solution which is selected to be of a particular composition and which is continuously maintained at an essentially constant level throughout the synthesis reaction. The maintenance of a working solution of essentially constant composition, what will be referred to herein as a "constant environment reaction system," eliminates the gross fluctuations in chloride ion content which, it has been found, promote the formation of glycol acetates. For example, in attempting to use a high chloride ion content in a batch system, an excessive amount of chloride ion must initially be charged to the working solution to compensate for the amount that will be eventually precipitated as cuprous chloride. During the first part of the reaction this high chloride content causes the formation of large quantities of glycol acetates and other by-products. A similar effect is even encountered when using a pipeline or tower-type reactor because the chloride ion content will be continuously diminishing as working solution proceeds through the system.

It is an object of the invention to provide an improved process for the production of vinyl acetate in high yield from ethylene. A further object of the invention is to provide an improved method for reacting ethylene with an acetic acid working solution of a palladium II salt, an ionizable metal acetate, and an oxidizing agent whereby vinyl acetate, with or without substantial amounts of acetaldehyde as desired, are produced in high yield and in high selectivity. Other objects of the invention will be apparent from the description which follows.

The objects of the invention are achieved in a cyclic method for preparing vinyl acetate from ethylene comprising (a) producing vinyl acetate in a first stage by
  (1) continuously charging to a constant environment mixer an acetic acid working solution of a palladium II salt, in ionizable metal chloride, cupric acetate, and 0% to 20% by weight of water, based on the acetic acid,
  (2) continuously contacting said working solution with ethylene in said mixer under conditions of agitation at an ethylene pressure of at least 100 p.s.i.g. and at a temperature of 50° to 150° C. to produce a reaction mixture containing vinyl acetate and partialy reduced working solution, and
  (3) continuously withdrawing from said mixer a portion of said reaction mixture,
  the flow rates of said working solution to the said mixer and of the reaction mixture therefrom being fixed at predetermined levels to maintain said reaction mixture at an essentially constant composition wherein the ionizable chloride content thereof is within the range of 0.01 to 0.50 molar;

(b) continuously stripping vinyl acetate as product from the reduced working solution of said withdrawn reaction mixture;

(c) continuously reoxidizing the stripped reduced working solution with oxygen; and (d) recycling the reoxidized working solution to the said mixer of step (a).

The cyclic method above described is advantageously operated at high conversion levels to minimize the formation of glycol acetates and other by-products. Thus the reaction mixture being continuously withdrawn from the constant enviornment mixer should have at least 70% by weight of its total copper content in couprous form, i.e. as cuprous chloride, thus indicating a conversion level of the same percentage. Conversion levels of at least 85%, indicated by the ratio of cuprous copper to total copper, preferred for maximum efficiency. It will be understood by those skilled in this technology that variables such as the concentration of ingredients in the reaction mixture, reaction temperature, ethylene pressure, and contact time can be suitably selected, within limits to be described below, to ensure operation at an appropriate conversion level.

Although the invention is particularly described herein with reference to the product of vinyl acetate, it will be understood that depending upon such factors as the water content and ethylene pressure of the reaction mixture, the synthesis reaction can also be operated to produce substantial quantities of acetaldehyde. In some instances it may be economically advantageous to recover acetaldehyde as product for sale or other use. In a preferred embodiment of the invention, however, acetaldehyde is produced in substantial proportions, e.g. in nearly equimolar amounts with vinyl acetate, and is subsequently oxidized to provide a source of acetic acid for fresh working solution which is charged to the synthesis mixer. In this case ethylene is essentially the sole component which must be continuously supplied in the cyclic process to produce vinyl acetate as product.

The reaction of ethylene and the ionizable metal acetate to produce vinyl acetate is catalyzed by the palladium II salt, probably through the intermediate formation of an ethylene-palladium II salt complex, e.g. $(C_2H_4 \cdot PdCl_2)_2$. When the ionizable acetate is cupric acetate, which would also function as the oxidizing agent, and a metal chloride (MCl) is present the synthesis reaction may be represented as follows:

(A) 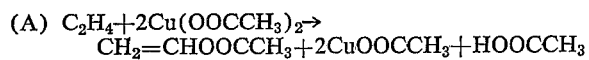

and

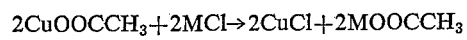

The regeneration reaction by which the cuprous acetate product of these reactions is reoxidized to cupric acetate for reuse is as follows:

(B) 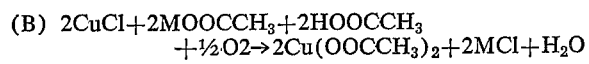

The net or over-all reaction is:

(C) 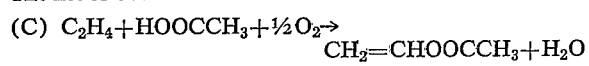

from which it will be seen that one mole of acetic acid is consumed and one mole of water is formed for each mole of vinyl acetate produced in the cycle.

The constant environment mixer employed in the synthesis reaction of the cyclic process of the invention may comprise a back-mixer kettle of conventional design or any other appropriate vessel in which no appreciable staging occurs. Thus the reaction mixture being continuously withdrawn therefrom should be essentially identical in composition to the reaction mixture in the mixture, whereas the composition of the working solution being continuously fed to the mixer is entirely different. The mixer should be provided with a stirrer or other means for providing agitation so as to ensure the maintenance of a uniform composition therein as working solution is being added. The provision of a second mixer in series with the first can, in some instances, be advantageously used to increase the conversion level and to improve the economics. In any case, however, a conversion level of at least 70% should be first achieved in the constant environment mixer if the formation of by-products is to be suitably minimized.

The working solution charged to the constant environment mixer for synthesis of vinyl acetate, also acetaldehyde if desired, comprises an acetic acid working solution of a palladium II salt as catalyst, an ionizable metal chloride and cupric acetate. Optionally, a metal acetate other than cupric acetate may be included. At least a small amount of water will also be normally contained in the working solution. It will be understood that the term "solution" is not intended to exclude the presence of suspended solids since frequently a portion of the ingredients, e.g. the copper salts or metal chloride, will not be dissolved.

Suitable palladium II salts for use in the working solution are the chloride ($PdCl_2$), the bromide ($PdBr_2$) and the acetate ($Pd(OAc)_2$); and the alkali metal chloro- and bromopalladites, such as potassium chloropalladite ($K_2PdCl_4$) and lithium chloropalladite ($Li_2PdCl_4$). Use of the palladous halide, $PdCl_2$ or $PdBr_2$, in the form of an alkali metal halopalladite, e.g. $Li_2PdlCl_4$, is generally preferred. The palladium II salt, the important part of which is the Pd II portion thereof, should be soluble in the working solution in an amount to provide a dissolved palladium II salt concentration of from 0.001 to 0.1 mole, or higher, preferably 0.003 to 0.03 mole, per liter. The palladium II salt can be charged to the working solution as one of the salts indicated above; or palladium metal, its oxide or carbonate may be charged and dissolved in the working solution.

Although the synthesis reaction requires the presence of an ionizable metal acetate, it is not essential that it be added to the working solution as such. As is evident from the equations given above as represeting this reaction, the metal chloride reacts with the suprous acetate at high conversion levels to produce the acetates of the corresponding metal.

If an ionizable metal acetate is to be included in the working solution in adidtion to cupric acetate, it can be an alkali metal acetate, although the acetates of the alkaline earth metals and magnesium can be used, as can also stannic, nickel and cobalt acetates. Such acetates can be charged as such or they can be formed by reaction of the oxides, hydroxides or carbonates of the indicated metals with the acetic acid component of the working solution. When a metal acetate other than cupric acetate is to be provided in the working solution, its concentration therein should be at least 0.01 molar, e.g., 0.01 to 1 molar; preferably it will be at least 0.1 molar, e.g. 0.1 to 0.5 molar. Concentrations exceeding the solubility of the metal acetate can be used.

Cupric acetate is advantageously used in the working solution at a concentration of 0.05 to 2.5 molar, although concentrations of 1.0 to 1.5 molar are preferred. At the higher of such concentrations, part of the cupric acetate will not dissolve and the charged working solution will be a slurry. As the reaction proceeds, cupric acetate in solution is reduced to the cuprous salt and more of the cupric acetate dissolves. In the presence of the halide ion, the reduced cuprous ion will precipitate as the cuprous halide and, therefore, the working solution will generally be a slurry whose solid phase will include either cupric acetate, cuprous halide, or both. A high cupric acetate content is desirable to provide a working solution of high synthesis capacity.

Cupric acetate may be added as such or as cupric chloride plus the metal acetate.

The ionizable metal chloride concentrattion of the working solution charged to the constant environment mixer is maintained at a high level. The concentration of ionizable metal halide, i.e., dissolved or undissolved but not precipitated halide such as precipitated cuprous chloride, should be at least 0.90 molar but not in excess of about 2.6 molar to maintain an appropriate constant level in the reaction mixture. The preferred ionizable metal halide concentration in the feed working solution is from 1.0 to 2.0 molar. A wide variety of metal chlorides may be used although those having an appreciable solubility in the acetic acid working solution under the reaction conditions, usually dissolving to the extent of 5% by weight or more, are preferred. Generally, those metal chlorides which ionize in water are most advantageous. The most satisfactory metal chlorides are those of alkali or alkaline earth metals, cobalt, and nickel. Magnesium chlorides as well as zinc chloride or mixtures of the two are also frequently desirable.

In the feed working solution the ratio of the molar concentration of ionizable chloride to ionizable $Cu^{+2}$ is in the range of 0.5 to 1.2, preferably 0.9 to 1.1. Higher ratios afford no benefit and only increase the formation of by-products. Lower ratios, on the other hand, result in substantial losses in conversion.

The water content of the working solution largely determines the amount of acetaldehyde produced. Therefore if the process is to be operated where acetic acid is available from some other operation, e.g., the manufacture of polyvinyl alcohol from polyvinyl acetate, for supplying part of the acetic acid required in the make-up of feed working solution, then it will usually be advantageous to keep the water content at a suitably low level, usually 0–5% by weight, based on the acetic acid, so as to produce little or no acetaldehyde. In a preferred embodiment, however, acetic acid is produced in the cyclic process by the formation of a substantial amount of acetaldehyde and the oxidation thereof to acetic acid. For this purpose the water content of the working solution and also of the reaction mixture may be up to 20%, but preferably is 5 to 10% by weight based on the acetic acid.

Since water is being continuously formed in the cyclic process by the oxidation of reduced working solution, it must be removed at some stage to maintain it as a constant level in the synthesis reaction. It may be removed after the oxidation of the reduced working solution, or more conveniently, along with vinyl acetate following the synthesis reaction.

The synthesis reaction is performed at a temperature of at least 50° C., e.g., 50 to 150° C. and at an ethylene pressure of at least 100 p.s.i.g., e.g. 100 to 2000 p.s.i.g. With lower pressures and temperatures the space-time yields are too low. Higher temperatures and pressure result in no added advantages. The preferred temperatures range from 90 to 130° C. while the preferred ethylene pressures range from 100 to 300 p.s.i.g. Depending upon such factors as the catalyst concentration and the reaction temperature and pressure, the contact time or dwell time in the mixer may be a minute or less. Contact times below 20 minutes, e.g. 5 to 10 minutes, are preferred in order to achieve maximum efficiency.

As indicated above, a critical feature of the invention involves the maintenance in the synthesis step of a reaction mixture of essentially constant composition. This is essential in order to avoid gross fluctuations in the concentration of the various components and to thereby minimize the production of by-products. When the reaction system is first put into operation, there may be a high proportion of ionizable metal chloride and copper acetate in the reaction mixture. However, as the reaction proceeds for a period of time a steady state will occur in which the composition of the reaction mixture does remain nearly constant. Thus, the ingredients of the feed working solution and their concentration therein will effectively compensate for the ingredients which are used up in the synthesis reaction and which may not be fully supplied by the oxidation of the reduced working solution. Working solution which has been appropriately made up to a composition as indicated above will thus be charged to the constant environment mixer at a fixed predetermined level. Likewise, the withdrawal of partially reduced working solution from the mixture will also be maintained fixed at a predetermined level to ensure a constant composition and volume level in the mixer during the synthesis reaction. It is of particular importance that once the synthesis reaction has reached a steady state, the ionizable chloride content of the reaction mixture remain at an essentially constant level. For the reasons indicated hereinbefore, this concentration must be within the range of 0.01 to 0.50 molar, but more advantageously is within the range of 0.03 to 0.30 molar. It will be understood that some fluctuations in the composition of the reaction mixture must be expected to occur over lengthy operating periods. Those should be of a minor nature, however, so that the ionizable chloride content will consistently remain within the stated range.

That portion of the reaction mixture which is being continuously withdrawn from the constant environment mixer is treated to strip vinyl acetate, along with any acetaldehyde also produced, from the partially reduced working solution. Water may likewise be removed at this stage. Vinyl acetate is separated as product from the stripped material. The remaining partially reduced working solution from which vinyl acetate, acetaldehyde and water have been removed is then passed to a second stage in which reoxidation thereof is continuously performed.

The oxidation of reduced copper is advantageously carried out with air although purified forms of oxygen may be used for this purpose. The oxidation or second stage reaction may be carried out in any conventional reactor although agitation is desirable to keep solids in suspension and to provide good contact between the gaseous reactant and the working solution. The reaction should be effected at a temperature of at least 50° C., e.g. 50°–150° C. or higher to ensure the desired reaction rate. The preferred temperatures range from 80–130° C. Oxygen partial pressures of from 0.01 to 2 atmospheres are generally suitable and when using air, operation with the system under pressure so as to give oxygen partial pressures within the above range is desirable. Whether using oxygen enriched gas or air, the preferred oxygen partial pressures range from 0.1 to 1 atmosphere.

The reoxidized working solution is then used for recycling to the constant environment mixer in the synthesis reaction. It may first be replenished with fresh acetic acid to compensate for any loss thereof in the cycle. In a preferred embodiment, however, all or part of the makeup acetic acid has been formed concomitantly by the oxidation of acetaldehyde. The latter process, which is fully described in U.S. patent application Ser. No. 345,507, filed Feb. 17, 1964, will be further understood by reference to the drawing and the discussion below.

The attached drawing is a schematic flow diagram of illustrative process operations for producing both vinyl acetate and acetic acid in accordance with the preferred embodiment of the invention. As illustrated therein ethylene is fed by way of line 1 to the SYNTHESIS REACTOR comprising a constant environment mixer, wherein it is contacted and reacted with agitated working solution to produce both vinyl acetate and acetladehyde and the working solution becomes at least partially reduced, i.e. at least 70% of the total copper content being in cuprous form. The reduced working solution containing the vinyl acetate and aldehyde is then passed through line 2 to the STRIPPER STILL where the solution is stripped of vinyl acetate and acetaldehyde which are removed as overhead products and pass via line 5 to the PRODUCT STILL where they are separated by fractionation. Water may similarly be removed at this stage and discarded. The vinyl acetate bottom product is removed from the latter still via line 19 while the acetaldehyde fraction is removed overhead. The stripped reduced working solution from the bottom of the STRIPPING STILL is passed via lines 3 and 4 to the MAIN OXIDIZER wherein it is contacted with oxygen, e.g., air, supplied via line 8, and thereby reconverted to its oxidized state. The reoxidized working solution is finally recycled via line 9 to the SYNTHESIS REACTOR for reuse.

The acetaldehyde overhead fraction from the PRODUCT STILL is passed by way of lines 6 and 7 to the MAIN OXIDIZER in which the acetaldehyde is oxidized to acetic acid simultaneously with the reoxidation of the working solution. When such oxidations are effected using air, unused air and nitrogen are vented via line 10. The acetic acid and any unconverted acetaldehyde flow via line 9 to the SYNTHESIS REACTOR along with the reoxidized working solution.

Since chloride ion tends to inhibit catalysis of the oxidation of acetaldehyde to acetic acid by cupric ions, it is preferred to effect conversion of at least a major part of the aldehyde to acetic acid in working solution which is substantially free of chloride ion while carrying out the vinyl acetate synthesis in working solution containing a substantial concentration of halide ion whose presence there is essential. This can be readily accomplished in accordance with another embodiment of the invention illustrated in hte drawing because the reaction mixture in the SYNTHESIS REACTOR will contain halide ion at a concentration below or approximating the cupric ion concentration so that substantially all halide ion will be precipitated as cuprous chloride as cupric ion becomes reduced. Part of the stripped reduced working solution from the STRIPPER STILL is passed to the MAIN OXIDIZER via lines 3 and 4 while the remainder is fed via lines 3 and 11 to the FILTER from which filtrate essentially free of chloride ion is passed to the SEPARATE OXIDIZER via line 13. The chloride-free working solution is mixed in the latter with acetaldehyde fed via lines 6 and 14. Oxidation of the aldehyde and the working solution occurs simultaneously in the SEPARATE OXIDIZER by means of oxygen or air introduced via lines 15 with the off-gas being vented from line 18. The resulting mixture is passed via line 16 to the MAIN OXIDIZER where it is mixed with the stream of unfiltered reduced working solution fed by way of lines 3 and 4. Cuprous chloride separated by the FILTER from the working solution fed to the SEPARATE OXIDIZER is passed, e.g., as a slurry, via line 12 into line 4 and thence to the MAIN OXIDIZER. As previously indicated, materials fed to the MAIN OXIDIZER are oxidized by oxygen fed via line 8 and then returned to the SYNTHESIS REACTOR by way of line 9. When air is fed via line 8 to the MAIN OXIDIZER, the oxygen-poor off-gas can be vented via line 10, or it can be passed via lines 17 and 15 to the SEPARATE OXIDIZER and there employed as the oxidizing gas. The use of such oxygen-poor off-gas from the MAIN OXIDIZER in the SEPARATE OXIDIZER makes safer the charging of acetaldehyde to the latter.

Instead of stripping all of the vinyl acetate product from the working solution in the STRIPPING STILL, as indicated by the drawing, the stripping operation can be effected so as to leave any desired part of the vinyl acetate in the working solution. Any such vinyl acetate left in the working solution will of course be continuously subjected to the hydrolytic action of the working solution as it progresses through the oxidizer, and the acetaldehyde resulting from the hydrolysis will be simultaneously subjected to the oxidizing action of the air fed to the oxidizer. Thus, one way of increasing the amount of acetaldehyde produced and converted to acetic acid is to leave some predetermined portion of the vinyl acetate in the working solution removed from the STRIPPING STILL. Also, when employing the SEPARATE OXIDIZER as described above the oxidized mixture therefrom and the reoxidized working solution from the MAIN OXIDIZER can, if desired, be recycled separately to the MAIN OXIDIZER.

The operations indicated by the drawing are carried out continuously. The SYNTHESIS REACTOR may be any time of constant environment mixer as described above. The STRIPPING STILL and FRACTIONATING STILL can be of any desired design to accomplish, respectively, the stripping of the volatile reaction products from the working solution and the separation thereof to give an acetaldehyde fraction for oxidation in the oxidizer. The FILTER, which can be of any desired design, can be replaced for example by a centrifuge or by a settling tank with provision for drawing off supernatant liquid therefrom to line 13 and provision for passing settled slurry to line 4. The entire system will of course include pumps and valves, or other equivalent means, where necessary, neither of which is indicated in the drawing. Although not indicated in the drawing, the working solution effluent from the SYNTHESIS REACTOR will generally be degased to free it of unreacted ethylene (which may be recycled) before it is passed to the STRIPPING STILL.

The invention is illustrated by the following examples. In the examples and throughout the specification, all composition percentages are by weight.

EXAMPLE I

A working solution charge is prepared by mixing the following compounds:

| Compound | Grams | Wt. percent | Moles/liter |
|---|---|---|---|
| Glacial acetic acid | 2,500 | | |
| Cupric acetate monohydrate | 750 | 21.9 | 1.30 |
| Lithium chloride | 175 | 5.1 | 1.43 |
| Lithium chloropalladite | 6.25 | | |
| (As PdCl$_2$) | 4.22 | .12 | .0083 |
| Water | | 2.0 | 1.3 |

In formulating the working solution, the lithium chloropalladite is predissolved in the acetic acid. The weight percent water indicated above is based upon the total weight of the working solution; when based upon the combined weights of acetic acid and water, the water content is 2.6%.

The charge is agitated to obtain a uniform slurry whose solid phase is cuprice acetate. The slurry is pumped continuously into a pressure reactor where it is contacted with ethylene at a pressure of 200 p.s.i.g. The reactor is of 80 cc. working capacity and is fitted with an agitator, an overflow line, and a temperature controller set for 100° C. The feed of working solution to the mixer and the withdrawal of the reaction mixture are maintained at fixed levels to maintain a constant volume in the vessel and a contact time of 6.3 minutes. After 40 minutes of operation the reactor effluent is sampled and is found to contain the following:

| | Percent |
|---|---|
| Acetic acid | 76.2 |
| Cupric acetate monohydrate | 1.8 |
| Lithium chloride | [1] 0.8 |
| Lithium chloropalladite | 0.18 |
| Lithium acetate | 6.6 |
| Cuprous chloride (insol.) | 9.8 |
| Vinyl acetate | 2.2 |
| Acetaldehyde | 1.0 |
| Water | [2] 1.5 |

[1] 0.22 molar concentration of Cl.
[2] Exclusive of H$_2$O in cupric acetate monohydrate; total H$_2$O content=1.7%.

The conversion of cupric acetate to vinyl acetate is 47.8% while the conversion to vinyl acetate and acetaldehyde is 91.2%. The molar ratio of acetaldehyde to vinyl acetate is 0.91. The productivity for vinyl acetate and acetaldehyde is 556 lbs./day/cu. ft. of working solution in the reactor, or 257 grams per gram of palladium chloride per hour.

The effluent is stripped of vinyl acetate, acetaldehyde, and water and then reoxidized with air at a temperature of 90° C. and under an oxygen partial pressure of 9 p.s.i.a. The concentration of ingredients in the eroxidized working solution is adjusted to the level of the initially prepared charge and is used for recycling to the synthesis reactor.

EXAMPLE II

A charge is prepared mixing the followin compounds. As in Example I, the lithium chloropalladite is predissolved in the acetic acid.

| Compound | Grams | Wt. percent | Moles/liter |
|---|---|---|---|
| Glacial acetic acid | 2,500 | | |
| Cupric acetate monohydrate | 750 | 22.0 | 1.31 |
| Lithium chloride | 144 | 4.2 | 1.18 |
| Lithium chloropalladite | 6.25 | | |
| (As $PdCl_2$) | 4.22 | .12 | .0083 |
| Water | | 2.0 | 1.3 |

This charge is passed through the continuous reactor as in Example I under 200 p.s.i.g. ethylene pressure at 100° C. After 40 minutes at a contact time of 6.8 minutes, the conversion level of the reactor effluent is 66.3% to vinyl acetate and 4.5% to acetaldehyde. Also produced is 4.9% of glycol acetates. The total copper conversion is 75.7%. The productivity for vinyl acetate and acetaldehyde is 513 pounds of vinyl acetate and acetaldehyde/day/cu. ft. of working solution in the reactor, or 235 grams/gram of palladium chloride/hr.

After the initial stages of the reaction the concentration of chloride ion in the reaction mixture remains steady at 0.28 molar. The partially reduced effluent is reoxidized, made up to its initial composition, and recycled to the synthesis reactor.

EXAMPLE III

A charge is prepared by mixing the following compounds. As in Example I, the lithium chloropalladite is predissolved in the acetic acid.

| Compound | Grams | Wt. percent | Moles/liter |
|---|---|---|---|
| Glacial acetic acid | 2,800 | | |
| Cupric acetate monohydrate | 840 | 20.6 | 1.22 |
| Lithium chloride | 172.5 | 4.2 | 1.10 |
| Lithium chloropalladite | 7.5 | | |
| (As $PdCl_2$) | 5.1 | .12 | .0078 |
| Water | 255 | 8.1 | 5.1 |

This charge is passed through the continuous reactor of Example I at 200 p.s.i.g. ethylene pressure and 100° C. After 60 minutes at a contact time of 9.5 minutes, the conversion of the copper acetate is 69% to vinyl acetate and 20.8% to acetaldehyde. The productivity is 394 lbs. of vinyl acetate/day/cu. ft. of working solution in the reactor, or 189 grams/gram of $PdCl_2$/hr.

The reactor effluent at the end of 60 minutes is found to contain the following:

|  | Percent |
|---|---|
| Acetic acid | 71.4 |
| Cupric acetate monohydrate | 2.1 |
| Lithium chloride | [1] 0.32 |
| Lithium chloropalladite | 0.18 |
| Lithium acetate | 6.0 |
| Cuprous chloride (insol.) | 9.1 |
| Vinyl acetate | 3.0 |
| Acetaldehyde | 0.47 |
| Water | [2] 7.4 |

[1] 0.08 molar concentration of Cl.
[2] Exclusive of $H_2O$ in cupric acetate monohydrate; total $H_2O$ content=7.9%.

The reactor effluent is distilled to remove vinyl acetate and acetaldehyde and is then reoxidized with oxygen at a temperature of 90° C. and oxygen partial pressure of 9 p.s.i.a The composition is readjusted as necessary to compensate for materials removed in the distillation and is then dehydrated to remove part of the water formed in the oxidation. It is then recycled to the continuous reactor under 200 p.s.i.g. ethylene pressure for one hour at 100° C. After an hour of operation in this manner, the temperature is raised to 120° C. The results obtained are as follows:

| Temp., °C.: | Contact time, min. | Cl content of effluent (molar) | Percent conversion to— Vinyl acetate | Percent conversion to— Acetaldehyde | Productivities Lbs./day/cu. ft. | Productivities Gm./gm. $PdCl_2$/hr. |
|---|---|---|---|---|---|---|
| 100 | 9.5 | 0.03 | 73 | 16.9 | 429 | 206 |
| 120 | 8.4 | 0.07 | 69 | 16.9 | 456 | 220 |

In a variation of the above, the vinyl acetate/acetaldehyde fraction stripped from the reactor effluent is distilled to separate vinyl acetate and acetaldehyde. The latter is separately oxidized to obtain acetic acid for use in making up the working solution to its original concentration. The oxidation process involves contacting the reduced working solution with air in the presence of 0.1% by weight, based on the solution, of cobalt acetate.

EXAMPLE IV

A charge was prepared by mixing the following compounds. Since $PdCl_2$ is essentially insoluble in acetic acid, it was added as a solid with the rest of the components.

| Compound | Grams | Wt. percent | Moles/liter |
|---|---|---|---|
| Glacial acetic acid | 2,800 | | |
| Cupric acetate monohydrate | 840 | 21.4 | 1.29 |
| Zinc chloride (fused) | 306 | 7.7 | [1] 1.29 |
| Palladium chloride | 6 | 0.15 | .0097 |
| Water | | 1.8 | 1.3 |

[1] Of chloride ion (M $ZnCl_2$=.645).

This charge is pumped through the continuous reactor as in the previous examples. The temperature is 100° C. and the ethylene pressure 200 p.s.i.g. After one hour and twenty minutes of continuous operation the conversion of copper acetate to acetaldehyde is 26% and vinyl acetate is 67%. The contact time is 8.0 minutes. The productivity for vinyl acetate and acetaldehyde is 500 lbs./day/cu. ft. of working solution in the reactor and 193 grams/gm. $PdCl_2$/hr.

Following operation in continuous manner as described above, a deliberate variation is made in the composition of the working solution. The reactor effluent collected is combined with the original working solution remaining and is stripped of acetaldehyde and vinyl acetate. Make-up is added to account for materials removed by distillation and the calculated water to be formed during reoxidation. In addition, 390 grams of water and 56 g. of anhydrous lithium acetate are added. Following oxidation at a temperature of 90° C. in an air atmosphere under an oxygen partial pressure of 9 p.s.i.a, the composition of the charge is:

| Compound | Grams | Wt. percent | Moles/liter |
|---|---|---|---|
| Glacial acetic acid | 2,800 | | |
| Copper acetate monohydrate | 840 | 19.1 | 1.15 |
| Zinc chloride | 306 | 7.0 | [1] 1.15 |
| Palladium chloride | 6 | .14 | .0086 |
| Lithium acetate | 56 | 1.3 | 0.23 |
| Water | 390 | 10.5 | 7.0 |

[1] Of chloride ion.

The charge is pumped through the continuous reactor at 100° C. and 200 p.s.i.g. pressure. After one hour and forty minutes at a contact time of 10.6 minutes the conversion of copper acetate to acetaldehyde is 33.1% and to vinyl acetate is 52.4%. The productivity of vinyl acetate and acetaldehyde is 284 lbs./day/cu. ft. of working solution in the reactor or 123 grams/gm. $PdCl_2$/hr. During the continuous process the reactor efflent is stripped to remove vinyl acetate, acetaldehyde and water. The acetaldehyde is fractionated therefrom, and converted to acetic acid by oxidation as above described. The acetic acid is combined with the stripped reduced working solution and the copper reoxidized as above. The oxidized working solution is then adjusted to compensate for materials removed and is recycled to the reactor.

EXAMPLE V

A charge is prepared of the following:

| Compound | Grams | Wt. percent | Moles/liter |
|---|---|---|---|
| Glacial acetic acid | 2,500 | | |
| Cupric acetate monohydrate | 750 | 20.6 | 1.24 |
| Magnesium chloride.6H₂O | 384 | [1] 4.9 | [2] 1.24 |
| Lithium chloropalladite | 6.25 | | |
| (As PdCl₂) | 4.22 | 0.12 | .0079 |
| Water | | 9.3 | 4.9 |

[1] Based on anhydrous MgCl₂.
[2] Of chloride ion.

This working solution charge is agitated as in Example I to produce a uniform slurry in which the solid fraction contains both copper acetate and magnesium chloride although each are soluble to some extent. The slurry is then pumped through the continuous reactor at 100° C. and at several different pressures. The results obtained are as follows:

| Pressure | Contact time, sec. | Percent conversion to— | | Productivities | |
|---|---|---|---|---|---|
| | | VAc | AcH | Lbs./day/cu. ft. | Gm./gm. PdCl₂/hr. |
| 100 p.s.i.g | 8.3 | 3.3 | 55.0 | 203 | |
| 200 p.s.i.g | 8.8 | 49.0 | 37.2 | 370 | 161 |
| 300 p.s.i.g | 8.6 | 61.5 | 24.6 | 414 | 197 |

The reactor effluent is stripped of vinyl acetate, acetaldehyde water. The acetaldehyde and stripped reduced working solution are then separately oxidized and combined as in Example IV to prepare a supply of working solution of the initial composition for charging to the synthesis reactor.

What is claimed is:

1. A cyclic method for preparing vinyl acetate from ethylene comprising
    (a) producing vinyl acetate in a first stage by
        (1) continuously charging to a constant environment mixer an acetic acid working solution of a palladium II salt at a concentration of 0.001 to 0.1 molar, an ionizable metal chloride at a concentration of 0.9 to 2.6 molar, cupric acetate at a concentration of 0.05 to 2.5 molar, and 0% to 20% by weight of water, based on the acetic acid, the concentrations of said metal chloride and cupric acetate being such as to provide a molar ratio of ionizable chloride to ionizable $Cu^{+2}$ of 0.5 to 1.2,
        (2) continuously contacting said working solution with ethylene in the substantial absence of oxygen in said mixer under conditions of agitation at an ethylene pressure of at least 100 p.s.i.g. and at a temperature of 50° to 150° C. to produce a reaction mixture containing vinyl acetate and partially reduced working solution with at least 70% by weight of the copper content thereof being in the form of cuprous chloride, and
        (3) continuously withdrawing from said mixer a portion of said reaction mixture,
        the flow rates of said working solution charged to said mixer and of the reaction mixture withdrawn therefrom being fixed at predetermined levels to maintain said reaction mixture in said mixer at an essentially constant composition wherein the ionizable chloride content thereof is within the range of 0.1 to 0.50 molar;
    (b) continuously stripping vinyl acetate as product from the reduced working solution of said withdrawn reaction mixture;
    (c) continuously reoxidizing the stripped reduced working solution with oxygen in a second stage; and
    (d) continuously recycling the reoxidized working solution to the said mixer of step (a).

2. Method according to claim 1 wherein said metal chloride is selected from the group consisting of alkali metal chlorides, alkaline earth metal chlorides, cobalt chloride, nickel chloride, magnesium chloride and zinc chloride.

3. Method according to claim 1 wherein the ionizable metal chloride content of the reaction mixture in said mixer is within the range of 0.03 to 0.30 molar.

4. Method according to claim 1 wherein the working solution charged to said mixer contains:
    said palladium II salt at a concentration of 0.003 to 0.03 molar,
    said ionizable metal chloride at a concentration of 1.0 to 2.0 molar,
    said cupric acetate at a concentration of 1.0 to 1.5 molar, and
    the molar ratio of ionizable chloride to ionizable $Cu^{+2}$ therein is in the range of 0.9 to 1.1.

5. Method according to claim 4 wherein the said working solution charged to the mixer contains an ionizable metal acetate other than said cupric acetate at a concentration of 0.01 to 1 molar.

6. Method according to claim 5 wherein said percent by weight of the copper content in the form of cuprous chloride is at least 85%.

7. Method according to claim 5 wherein the water content of said working solution is 5% to 10% by weight, based on the acetic acid.

8. Method according to claim 5 wherein the contact time of said ethylene with the working solution in said mixer is less than 10 minutes.

9. Method according to claim 5 wherein said temperature is 90° to 130° C.

10. Method according to claim 5 wherein said ethylene pressure is 100 to 300 p.s.i.g.

References Cited

UNITED STATES PATENTS

| | | | |
|---|---|---|---|
| 1,976,756 | 10/1934 | Walker et al. | 260—530 |
| 3,321,045 | 11/1965 | McKeon et al. | 260—497 |
| 3,260,739 | 7/1966 | Schaeffer | 260—497 |
| 3,450,748 | 6/1969 | Schaeffer | 260—497 |

JAMES A. PATTEN, Primary Examiner

V. GARNER, Assistant Examiner

U.S. Cl. X.R.

252—416; 260—530, 541, 601, 604